United States Patent
Stilley et al.

(10) Patent No.: US 7,820,924 B2
(45) Date of Patent: Oct. 26, 2010

(54) MULTI-DIRECTION SWITCH FOR A CURSOR DEVICE

(75) Inventors: Russell Lynn Stilley, Dallas, TX (US); Darrell Lee Johnson, Murphy, TX (US); Jose Antonio Fernandez, Plano, TX (US); Russell Melvin Rosenquist, Plano, TX (US); Thomas Brian Olson, Allen, TX (US); Veronica Bailey Howard, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 893 days.

(21) Appl. No.: 11/559,341

(22) Filed: Nov. 13, 2006

(65) Prior Publication Data

US 2007/0200735 A1    Aug. 30, 2007

Related U.S. Application Data

(60) Provisional application No. 60/776,038, filed on Feb. 23, 2006.

(51) Int. Cl.
   *H01H 25/04* (2006.01)
(52) U.S. Cl. .................................. 200/5 R; 200/6 A
(58) Field of Classification Search .............. 200/5 R, 200/6 A, 18; 341/20, 22, 35; 345/156, 157, 345/160–162, 168, 169, 184

See application file for complete search history.

(56) References Cited

U.S. PATENT DOCUMENTS

| | | | | |
|---|---|---|---|---|
| 5,225,831 A * | 7/1993 | Osborn | ......................... | 341/20 |
| 5,555,004 A * | 9/1996 | Ono et al. | .................... | 345/161 |
| 5,619,021 A * | 4/1997 | Yamamoto et al. | ........... | 200/6 A |
| 5,691,517 A * | 11/1997 | Yamamoto et al. | ........... | 200/6 A |
| 5,744,765 A * | 4/1998 | Yamamoto | .................... | 200/6 A |
| 6,160,225 A * | 12/2000 | Isikawa | .......................... | 200/4 |
| 6,344,618 B1 * | 2/2002 | Sato | ............................ | 200/6 A |
| 6,903,724 B2 * | 6/2005 | Grivas et al. | ................. | 345/161 |
| 7,078,633 B2 * | 7/2006 | Ihalainen | ..................... | 200/6 A |
| 7,288,732 B2 * | 10/2007 | Hashida | ....................... | 200/5 A |
| 7,442,886 B2 * | 10/2008 | Hashida | ....................... | 200/5 R |

OTHER PUBLICATIONS

ClassPad300Plus At A Glance, http://www.casio.com/products/Calculators_&_Dictionaries/Graphing/ClassPad300Plusi, Jun. 15, 2006, 2 pgs.

(Continued)

*Primary Examiner*—Michael A Friedhofer
(74) *Attorney, Agent, or Firm*—Mirna Abyad; Wade J. Brady, III; Frederick J. Telecky, Jr.

(57) ABSTRACT

A directional controller for a device is provided. The directional controller consists of keypad contacts, a keyboard, and a button. The keypad contacts are on a printed circuit board. The keyboard has more than four keys and each key is disposed adjacent to one of the keypad contacts. The button is operable for pivoting engagement with the more than four keys to promote contact between the more than four keys and the adjacent one of the keypad contacts.

18 Claims, 8 Drawing Sheets

OTHER PUBLICATIONS

Special Features ClassPad300Plus At A Glance, http://www.casio.com/products/Calculators_A_Dictionaries/Graphing/ClassPad300Plus/content/Special Features, Jun. 15, 2006, 1 pg.

Technical Specs ClassPad300Plus At A Glance, http://www.casio.com/products/Calculators_&_Dictionaries/Graphing/ClassPad300Prus/content/Technical Specs, Jun. 15, 2006, 4 pgs.

Accessories ClassPad300Plus At A Glance, http://www.casio.com/products/Calculators_&_Dictionaries/Graphing/ClassPad300Plus/accessories, Jun. 15, 2006, 1 pg.

Casio CiassPad 300, http://www.classpad.org/index.php, Jun. 15, 2006, 1 pg.

ClassPad Explorations, http://wvvw.classpad.org/explorations.html?, Jun. 15, 2006, 1 pg.

Casio ClassPad 300 Overview, http://www.classpad.org/overview.html, Jun. 15, 2006, 2 pgs.

HP 38G student graphic calculator, 1995, http://www.hp.com/hpinfo/abouthp/ histnfacts/museum/personalsystems/0026/index.html, Jun. 15, 2006, 2 pgs.

Math Xpander, http://www.saltire.com/xpander.html, Jun. 15, 2006, 2 pgs.

Creating HP 38G Aplets, Jun. 1996 Hewlett-Packard Journal, pp. 3-11.

HotLinked Parabolic Mirrors, Getting the Most Out of Classpad, Jun. 15, 2006, pp. 58-62.

* cited by examiner

MULTI-DIRECTION SWITCH FOR A CURSOR DEVICE

CROSS-REFERENCE TO RELATED APPLICATIONS

This application claims priority to the provisional application, U.S. Pat. App. No. 60/776,038, entitled "Sixteen Direction Switch for a Cursor Device", filed on Feb. 23, 2006, by Russell Lynn Stilley, et al. The above-referenced provisional application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The disclosure is directed to an input device for electronic devices, and more particularly, but not by way of limitation, to a system and method for providing fine direction control for a cursor in a display on a handheld electronic device.

BACKGROUND OF THE INVENTION

Handheld electronic devices, such as calculators, telephones, personal digital assistants, handheld computers, handheld gaming devices, and similar devices, often contain a liquid crystal display or similar means for the display of graphical information. Such a display often contains a cursor or other indicator to indicate where an action is occurring or can occur within the display. For example, the display of a calculator might contain a cursor to indicate a location where data can be entered. The display of a gaming device might contain a character whose movement can be controlled by a game player or might contain a pointer to indicate a position where the game player can cause an action to occur in the display. A spreadsheet application executing on a handheld computer might contain an active cell into which data can be entered. Any such indicator will be referred to herein as a cursor.

Several means currently exist for controlling the movement of a cursor. For example, the keyboard of a device may contain arrow keys that can cause up, down, left, and right movement of a cursor. A device might also contain a joystick or similar mechanism to provide a greater range of cursor control. A mouse or similar pointing tool may also be present on a device. One of skill in the art will be familiar with other means for controlling the movement of a cursor.

SUMMARY OF THE INVENTION

In one embodiment, a directional controller for a device is provided. The directional controller consists of keypad contacts, a keyboard, and a button. The keypad contacts are on a printed circuit board. The keyboard has more than four keys and each key is disposed adjacent to one of the keypad contacts. The button is operable for pivoting engagement with the more than four keys to promote contact between the more than four keys and the adjacent one of the keypad contacts.

In another embodiment, a method for user input is provided. The method consists of selecting one or more of at least eight keys and determining, based on the selected keys, one of at least sixteen directions based on which of the one or more of the at least eight keys were selected.

In another embodiment, a machine readable medium containing software instructions to promote a user using keys on a device for navigation is provided. The software instructions are programmed to determine, in response to keys being engaged on the device by the user and using a processor, one of at least sixteen directions indicated based on which keys were engaged.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
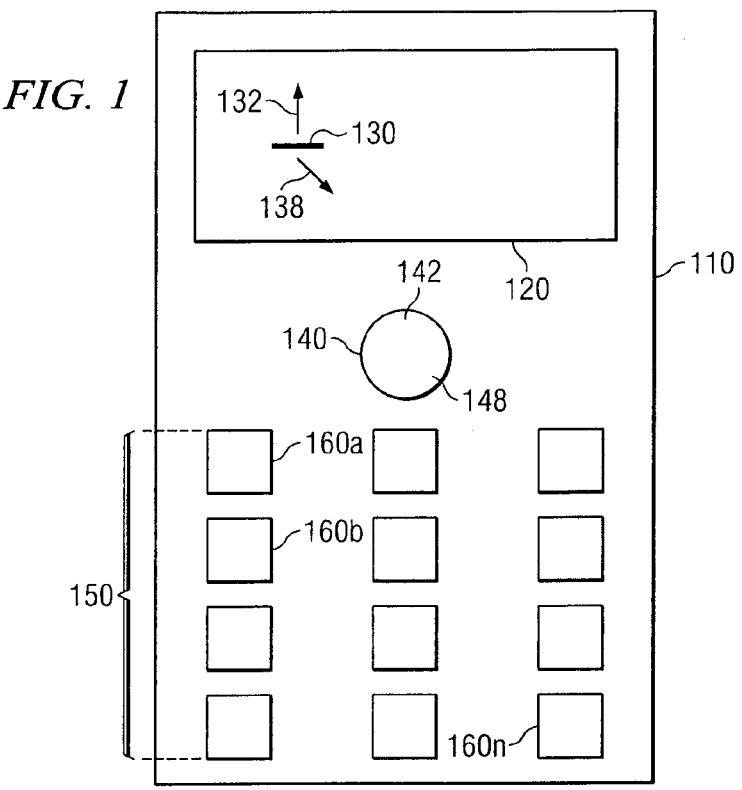
FIG. 1 is a diagram of a handheld electronic device according to an embodiment of the disclosure.

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein.

This application contains subject-matter similar to U.S. patent application Ser. No. 60/775,959, entitled Modeling Environment with Generally Accessible Variables for Dynamically Linked Mathematical Representation, Nikhil Nilakantan et al. inventors, U.S. patent application Ser. No. 60/776,150, entitled Dynamic Data Flow and Data Linking, Gregory Springer et al. inventors, U.S. patent application Ser. No. 60/775,958, entitled Using a Document Model to Create and Maintain Dynamic Mathematic Representations Through Problem Spaces, Nikhil Nilakantan et al. inventors, U.S. patent application Ser. No. 11/360,258, entitled Tabular Environment that Supports Column Rules and Cell Rules, Nikhil Nilakantan, all of which were filed on Feb. 23, 2006 and all of which are incorporated herein by reference for all purposes.

The disclosure, according to one embodiment, provides a system and method for the control of the movement of a cursor in a display on a handheld electronic device. Eight keypad contacts are arranged in an approximately circular pattern on a printed circuit board (PCB) within the device. Alternatively, a flexible circuit film could be used instead of the PCB. As used herein, the term 'PCB' will refer to a circuit board, a circuit film, or a similar apparatus for establishing an electronic circuit within a handheld electronic device.

The keypad contacts are approximately evenly spaced from each other so that an approximately 45-degree angle is formed between any two adjacent keypad contacts. An elastomer keyboard with eight elastomer keys arranged in a pattern similar to the pattern of the keypad contacts is disposed above the PCB. Each of the eight elastomer keys is positioned above a keypad contact so that pressing one of the elastomer keys can create an electrical connection on a corresponding keyboard contact.

An approximately circular button or similar rigid apparatus is disposed above the elastomer keys so that pressing the button presses one or more of the elastomer keys. The lower portion of the button is in the interior of the device where it can make contact with the elastomer keys. The upper portion of the button extends to the exterior of the device where it can be contacted by a user of the device.

In an embodiment, the approximate center of the lower portion of the button is disposed above and approximately adjacent to the approximate center of an approximately cylindrical, upright, rigid support pillar on the elastomer keyboard. The diameter of the button is substantially larger than the diameter of the pillar so that the button can pivot about the pillar. The pillar is located approximately in the center of the elastomer keys. Pressing near an outer edge of the upper portion of the button causes the button to pivot about the pillar, causing one or more elastomer keys to be pressed, and thus causing electrical contact on one or more keypad contacts. An electrical contact on a keypad contact can cause an input signal to be generated.

A software component within the device is capable of converting input signals received from the keypad contacts into instructions for controlling the movement of a cursor. When electrical contact is made on a single keypad contact, the software causes the cursor to move in a direction corresponding to the position of that keypad contact. When electrical contact is made on two adjacent keypad contacts, the software causes the cursor to move in a direction corresponding to a position approximately halfway between the positions of those keypad contacts. Since there are eight keypad contacts and eight positions approximately halfway between the keypad contacts, the cursor can be moved in sixteen different directions.

FIG. 1 illustrates an example of a device 110 that might use a 16-direction cursor control switch according to the disclosure. The device 110 might be a calculator, telephone, personal digital assistant, handheld computer, handheld gaming device, or similar implement. For simplicity of disclosure, the device 110 is illustrated as a calculator; however, it should be appreciated that the directional controller of the disclosure may be implemented in any number of different devices. A display area 120 allows graphical information and other information to be depicted. On a calculator, the display area 120 might show numbers, graphs, or other mathematics-related items. On a handheld computer, the display area 120 might show a spreadsheet, a computer-generated drawing, or other graphical data specific to an application executing on the handheld computer. Other types of information might be displayed on other types of devices 110.

The display area 120 typically contains a cursor 130 that can perform different functions on different devices 110. On a calculator, the cursor 130 might indicate a position where a number can be entered or might be an arrow or pointer used to select a point on a graph shown in the display area 120. On a gaming device, movement of the cursor 130 might cause movement of a character in a game or might cause movement of a crosshairs symbol that indicates where an action can occur in the display area 120. One of skill in the art will recognize other uses for a cursor 130 and the desirability of a device 110 offering fine control over the movement of a cursor 130.

The device 110 might also include a button area 150 that contains a plurality of buttons 160a, 160b, . . . 160n. The buttons 160 can be used to enter data into the device 110 and might also be used to control the movement of the cursor 130. For example, on a calculator, the buttons 160 might be associated with numbers so that when a button 160 is pressed, the corresponding number appears in the display area 120. The buttons 160 might also be associated with cursor directions so that when a button 160 is pressed, the cursor 130 moves in the corresponding direction.

In addition, the device 110 includes a circular button 140 that can control the movement of the cursor 130. Pressing near the perimeter of the circular button 140 causes the cursor 130 to move in a direction that corresponds to the portion of the circular button 140 that was pressed. For example, if the upper portion 142 of the circular button 140 is pressed, the cursor 130 moves in an upward direction 132. If the lower right portion 148 of the circular button 140 is pressed, the cursor 130 moves in a downward and right direction 138.

Figure 2:
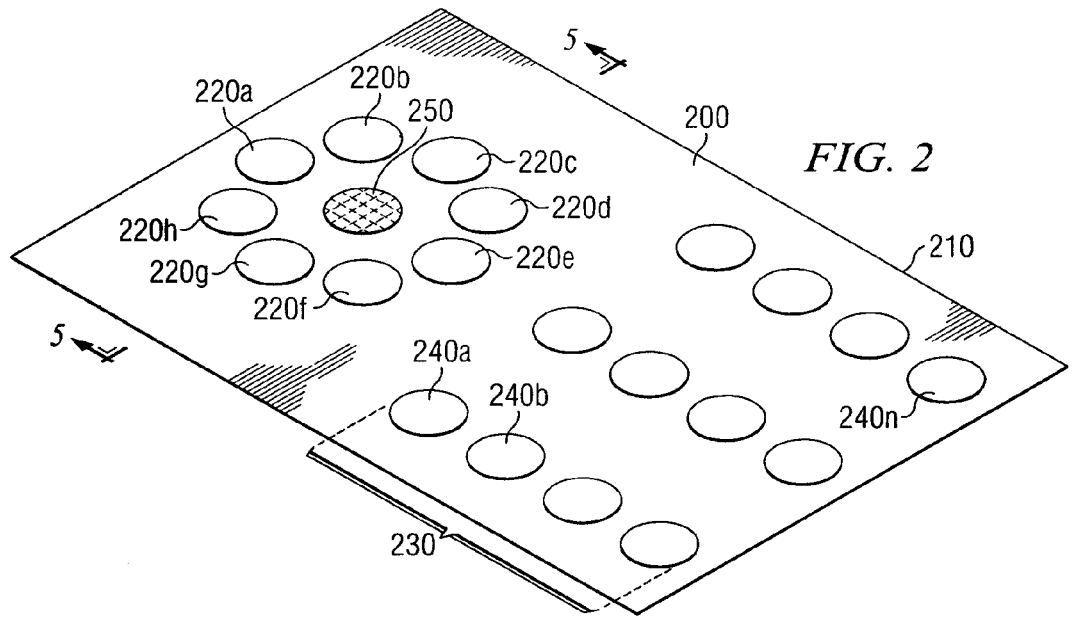
FIG. 2 is a diagram of the upper surface of an elastomer keyboard according to an embodiment of the disclosure.

FIG. 2 illustrates the upper surface 200 of an embodiment of an elastomer keyboard 210 that might be present in the interior of the device 110. The elastomer keyboard 210 is generally rubbery and flexible and constructed from substantially flexible polymeric materials. In an alternative embodiment, metal domes or a similar apparatus could be used instead of the elastomer keyboard 210. The term 'elastomer keyboard' will be used herein to refer to any apparatus that can perform functions similar to those of the elastomer keyboard 210 described herein.

The elastomer keyboard 210 includes a first group of elastomer keys 220 arranged in an approximately evenly spaced, generally circular configuration. Each of the elastomer keys 220 is approximately the same height. The diameter of the circle formed by the plurality of elastomer keys 220 may be similar to the diameter of the circular button 140. The elastomer keyboard 210 also includes a second group 230 of elastomer keys 240a, 240b, . . . 240n arranged in a pattern similar to the pattern of the button area 150. In an embodiment, the keys 220 and the keys 240 have approximately the same height so that a plane through the upper surfaces of the keys 220 and the keys 240 is approximately parallel to the upper surface 200 of the elastomer keyboard 210.

The elastomer keyboard 210 is positioned in the device 110 in such a manner that the center of the circle formed by the elastomer keys 220 is approximately beneath the center of the circular button 140 and the second group 230 of elastomer keys 240 is approximately beneath the button area 150. That is, each elastomer key 240 is beneath a corresponding button 160.

In an embodiment, the elastomer keyboard 210 also includes a support pillar 250 located approximately in the center of the circle formed by the first group of elastomer keys 220. The support pillar 250 in some embodiments may be constructed of a substantially rigid material to support the button 140. The support pillar 250 has the approximate form of a cylinder resting on the upper surface 200 of the elastomer keyboard 210. The height of the support pillar 250 is approximately the same as, but may be higher or lower than, the heights of the elastomer keys 220.

The lower surface of the circular button 140 can contact the upper surface of the support pillar 250 and may also contact the elastomer keys 220. When an outer portion of the circular button 140 is pressed, the circular button 140 can pivot on the support pillar 250 and press one or more of the elastomer keys 220 that is beneath the portion of the circular button 140 that was pressed.

Figure 3:
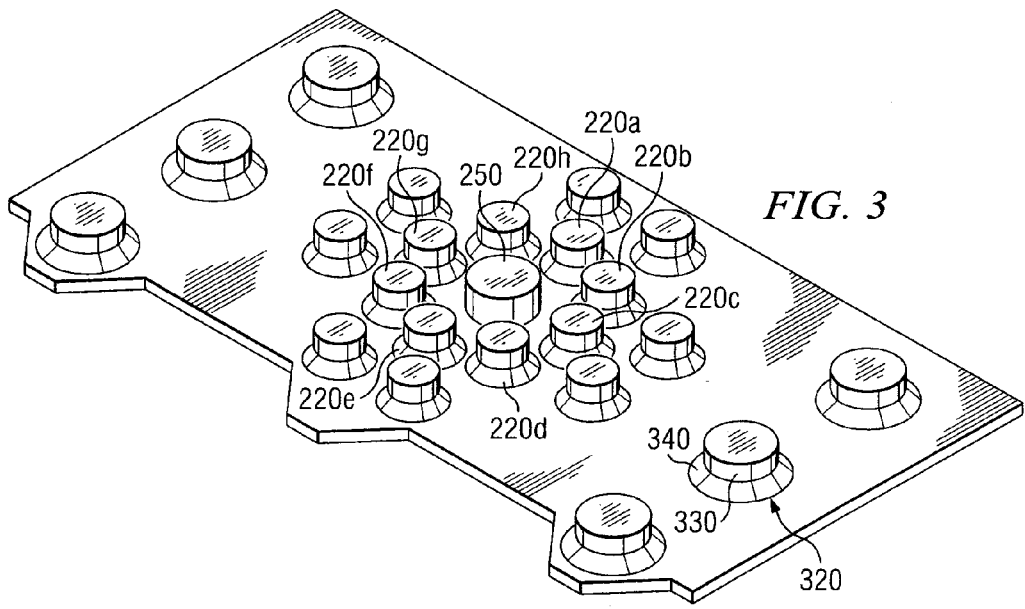
FIG. 3 is a three-dimensional depiction of the upper surface of an elastomer keyboard according to an embodiment of the disclosure.

FIG. 3 provides a three-dimensional depiction of a portion of the upper surface 200 of an elastomer keyboard 210. This portion contains the first group of elastomer keys 220 and the support pillar 250, as well as several other elastomer keys 320. The other elastomer keys 320 are not directly relevant to the switch described herein. However, the compact nature of the grouping of keys 220 in FIG. 3 presents difficulties in pointing out the features of the keys 220. Therefore, since the shape of the other elastomer keys 320 is approximately the same as the shape of the elastomer keys 220, and since the other elastomer keys 320 are more visible in the drawing, the features of the other elastomer keys 320 will be described instead. It should be understood that the descriptions of the other elastomer keys 320 are equally applicable to the elastomer keys 220.

It can be seen that each elastomer key 320 includes an upper portion 330 and a lower skirt portion 340. In this embodiment, the upper portion 330 is generally cylindrical, with the circular surfaces of the cylinder being approximately parallel with the upper surface 200 of the elastomer keyboard 210. The skirt portion 340, in this embodiment, maintains an approximately circular shape, the diameter of which increases gradually from its upper portion to its lower portion. The lower portion of the skirt portion 340 is adjacent to the upper surface 200 of the elastomer keyboard 210. In other embodiments, the upper portion 330 and the lower portion 340 could have other shapes.

The upper portion 330 is substantially solid and rigid, while the skirt portion 340 is substantially hollow and flexible. Downward pressure on the upper surface of the upper portion 330 can cause the skirt portion 340 to flex and collapse, thus allowing the upper portion 330 to move downward through a hollow space within the skirt portion 340.

Figure 4:
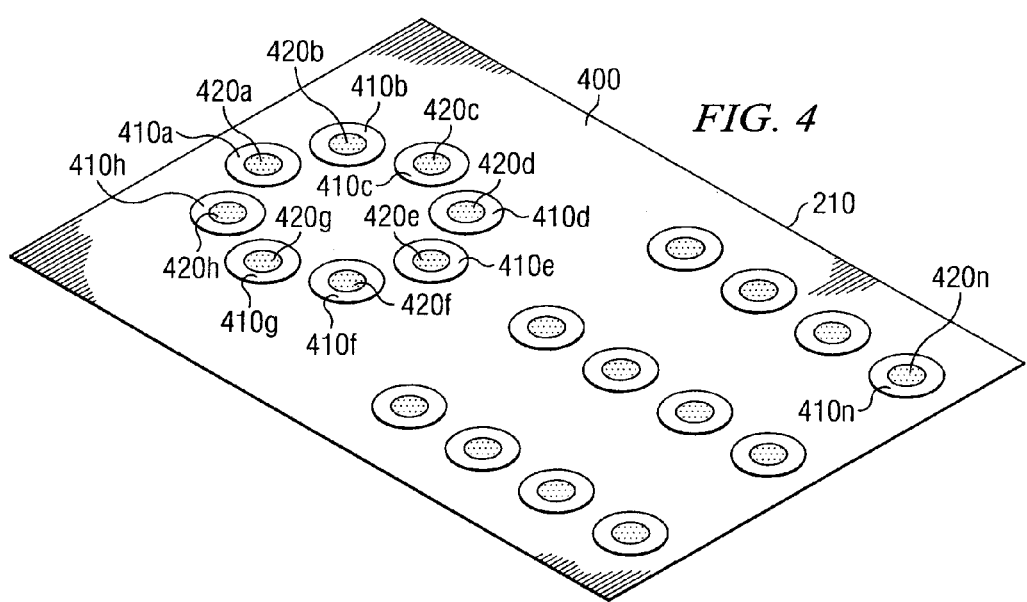
FIG. 4 is a diagram of the lower surface of an elastomer keyboard according to an embodiment of the disclosure.

FIG. 4 illustrates the lower surface 400 of an elastomer keyboard 210. The bottom surfaces 410 of the elastomer keys 220 and 240 are visible. Each of the bottom surfaces 410 is covered with a conducting material 420. More particularly, the bottom surfaces 410 of the upper portions 330 of the elastomer keys 220 and 240 are covered with the conducting material 420. When the elastomer keys 220 or 240 are in their normal positions (shown in FIG. 3), the conducting material 420 on the elastomer keys 220 or 240 is raised above the lower surface 400 of the elastomer keyboard 210 by a distance approximately equal to the height of the skirt portion 340. When the elastomer key 220 or the elastomer key 240 is pressed, the conducting material 420 on the elastomer key 220 or the elastomer key 240 moves toward the lower surface 400 of the elastomer keyboard 210 to engage contacts (not shown) to complete an electrical connection on a printed circuit board (illustrated and discussed below).

The conducting material 420 is typically a layer of carbon or a carbon-based compound. The conducting material 420 can be placed on the elastomer keys 220 or the elastomer keys 240 through a printing process, a silk-screening process, a placement of a conductive rubber insert, or through other techniques known to one of skill in the art.

Figure 5:
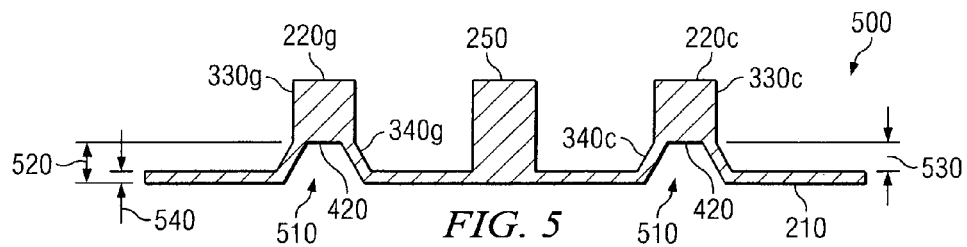
FIG. 5 is a cross section view of an elastomer keyboard according to an embodiment of the disclosure.

FIG. 5 illustrates a cross-section view 500 of elastomer key 220c, elastomer key 220g, and the support pillar 250. It can be seen that the support pillar 250 is solid while the elastomer keys 220 have a hollow space 510 within the skirt portion 340 below the upper portion 330. The conducting material 420 coats the lower surface of the upper portion 330. When sufficient pressure is placed on the upper surface of one of the elastomer keys 220, the flexibility of the skirt portion 340 allows the upper portion 330 to move through the hollow space 510 a distance 520 approximately equal to the height 530 of the skirt portion 340 plus the thickness 540 of the elastomer keyboard 210. That is, when an elastomer key 220 is pressed, the conducting surface 420 can be brought near the lower surface 400 of the elastomer keyboard 210.

Figure 6:
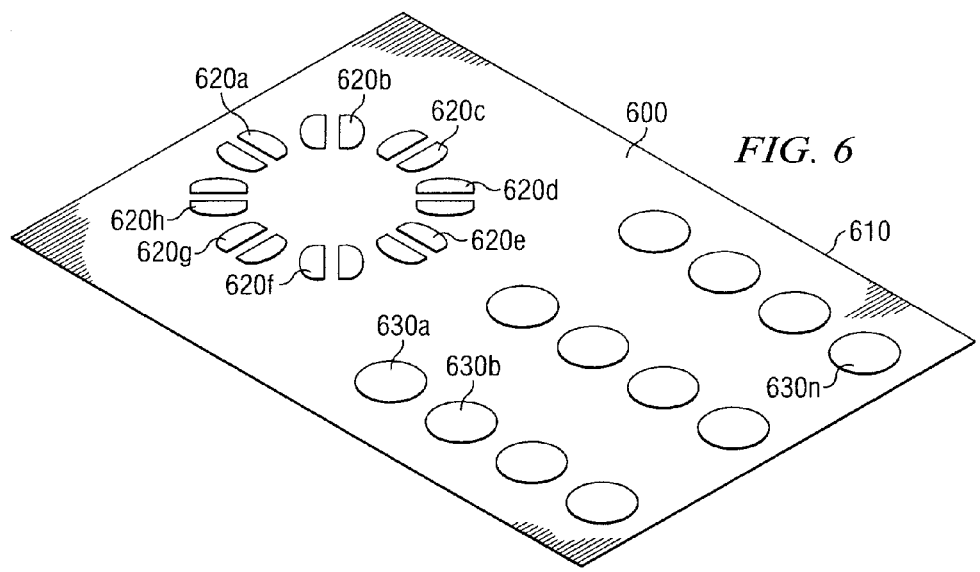
FIG. 6 is a diagram of a printed circuit board according to an embodiment of the disclosure.

FIG. 6 illustrates the upper surface 600 of an embodiment of a printed circuit board (PCB) 610 that might be present in the interior of a device 110. The PCB 610 contains eight keypad contacts 620 arranged in a pattern similar to the pattern of the elastomer keys 220. The PCB 610 also contains a plurality of keypad contacts 630 arranged in a pattern similar to the pattern of the elastomer keys 240.

The lower surface 400 of the elastomer keyboard 210 is placed in contact with the upper surface 600 of the PCB 610. The elastomer keyboard 210 is positioned in such a manner that the keypad contacts 620 are approximately beneath the elastomer keys 220 and the keypad contacts 630 are approximately beneath the elastomer keys 240. That is, each keypad contact 620 is beneath an elastomer key 220 and each keypad contact 630 is beneath an elastomer key 240.

The keypad contacts 620 contain two portions that are normally insulated from each other and that are normally maintained at different electrical potentials. When one of the elastomer keys 220 is pressed, the conducting surface 420 can be lowered to the point where the conducting surface 420 makes contact with the underlying keypad contact 620. Electricity can then flow through the conducting surface 420 from one portion of the keypad contact 620 to the other. Thus, pressing a perimeter portion of the circular button 140 causes one or more elastomer keys 220 beneath the circular button 140 to be pressed, which can cause contact to be made between the two portions of one of the keypad contact 620, which can in turn cause an electrical circuit to be completed. The completion of the electrical circuit can produce an input signal.

In an embodiment, an input signal generated in this manner is sent to a software component, which is described in detail below. The software component is capable of interpreting the input signal as a direction in which a cursor 130 is to move. For example, pressing the upper portion 142 of the circular button 140 might cause elastomer key 220*a* to be pressed. This might cause the conducting surface 420 of elastomer key 220*a* to make contact with the underlying keypad contact 620*a*. The electrical signal generated when the two portions of keypad contact 620*a* are brought into contact by the conducting surface 420 can cause the cursor 130 to move in the direction 132 shown in FIG. 1. Similarly, pressing the lower right portion 148 of the circular button 140 might cause the cursor 130 to move in the direction 138.

When the circular button 140 is pressed in such a manner that electrical contact is made on only one keypad contact 620, the cursor 130 moves in a direction that corresponds to the location of that keypad contact 620. For example, the location of keypad contact 620*a* can be referred to as zero degrees, the location of keypad contact 620*b* can be referred to as 45 degrees, and so on to the location of keypad contact 620*h*, which can be referred to as 315 degrees. Electrical contact made on only one of the keypad contacts 620 will cause cursor movement at a 0-degree angle, or a 45-degree angle, or a 90-degree angle, etc., up to a 315-degree angle. That is, contact on only one keypad contact 620 will cause cursor movement in one of eight directions.

In an embodiment, the circular button 140 can be pressed in such a manner that electrical contact is made simultaneously on more than one keypad contact 620. Each keypad contact 620 on which electrical contact is made can generate a separate input signal. The input signals produced in this manner are sent to the software component, which can interpret the plurality of input signals as a direction for cursor movement and can cause cursor movement in that direction.

When contact is made on two adjacent keypad contacts 620 simultaneously, such as 620*b* and 620*c*, the software component causes cursor movement in a direction corresponding to an angle that bisects the angle formed by the two keypad contacts 620. When contact is made on three adjacent keypad contacts 620 simultaneously, the software component causes cursor movement in a direction corresponding to the location of the centrally located keypad contact 620 of the three keypad contacts 620. When contact is made on four adjacent keypad contacts 620 simultaneously, the software component causes cursor movement in a direction corresponding to an angle that bisects the angle formed by the two centrally located keypad contacts 620 of the four keypad contacts 620.

For example, if the circular button 140 is pressed in such a manner that elastomer keys 220*a* and 220*b* are pressed simultaneously, electrical contact can be made on keypad contacts 620*a* and 620*b* simultaneously. The input signals generated by keypad contacts 620*a* and 620*b* are sent to the software component, which causes a cursor movement at an angle halfway between the angle formed by keypad contacts 620*a* and 620*b*. That is, if keypad contact 620*a* is at a 0-degree position and keypad contact 620*b* is at a 45-degree position, the software component will direct the cursor 130 to move at a 22.5-degree angle.

Similarly, if the circular button 140 is pressed in such a manner that elastomer keys 220*a*, 220*b*, and 220*c* are pressed simultaneously, electrical contact can be made on keypad contacts 620*a*, 620*b*, and 620*c* simultaneously. The input signals generated by keypad contacts 620*a*, 620*b*, and 620*c* are sent to the software component, which causes a cursor movement at an angle corresponding to the location of keypad contact 620*b*. That is, if keypad contact 620*a* is at a 0-degree position, keypad contact 620*b* is at a 45-degree position, and keypad contact 620*c* is at a 90-degree position, the cursor 130 will move at a 45-degree angle. Similar cursor movement occurs when four or more keys are pressed.

It can be seen that the combination of the circular button 140, the support pillar 250, the elastomer keys 220, the keypad contacts 620, and the software component can cause cursor movement in sixteen evenly spaced directions. Eight directions correspond to the locations of the keypad contacts 620 and eight other directions correspond to locations halfway between the locations of the keypad contacts 620.

Due to the shape, rigidity, and other mechanical characteristics of the circular button 140 and the support pillar 250, it is anticipated that the simultaneous pressing of more than four elastomer keys 220 or of non-adjacent elastomer keys 220 will not be possible. Thus, when the support pillar 250 is present, simultaneous input signals are not anticipated to be generated by more than four keypad contacts 620 or by non-adjacent keypad contacts 620. However, one of skill in the art will recognize that the software component could be designed to provide an appropriate interpretation for such anomalous input signals.

Also, it should be noted that, while the previous discussion has focused on an arrangement of eight keypad contacts 620 separated by 45-degree angles, other keypad contact arrangements could be used. For example, five keypad contacts could be separated by 72-degree angles, six keypad contacts could be separated by 60-degree angles, twelve keypad contacts could be separated by 30-degree angles, etc. Also, the separation between the keypad contacts does not necessarily need to be consistent. However, it is anticipated that such alternative arrangements would cause movements of the cursor 130 that users of the device 110 would find unfamiliar and difficult to control. Since the display area 120 is two-dimensional, cursor movement with a natural feel for most users will occur when the number of keypad contacts is a power of two (i.e., 4, 8, 16, etc.) and when the keypad contacts are evenly spaced.

Figure 7:
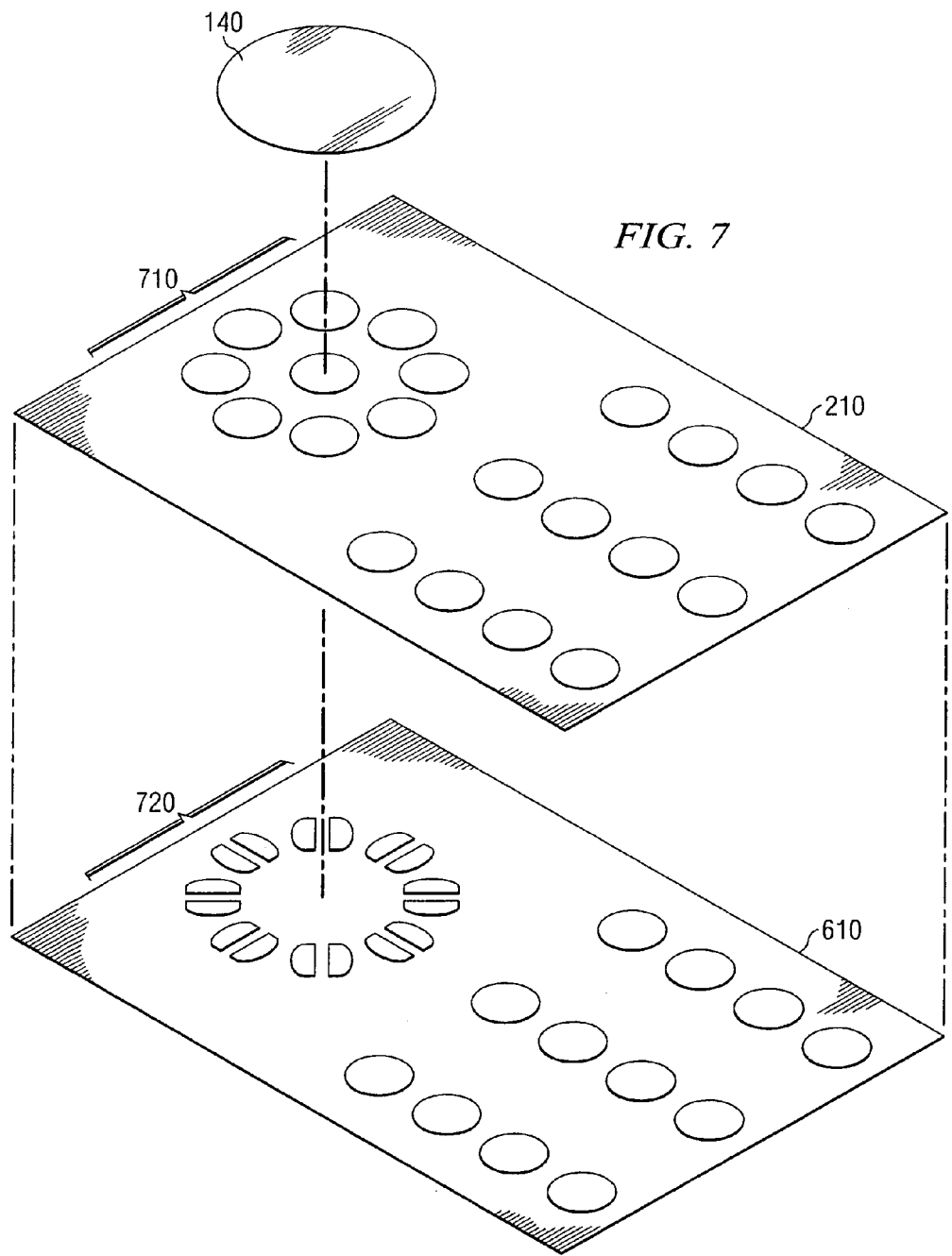
FIG. 7 is a diagram of a portion of the components that might comprise a handheld electronic device according to an embodiment of the disclosure.

Turning now to FIG. 7, an exploded view of a portion of the components that might make up the device 110 is shown. This view illustrates the circular button 140 as disposed above the elastomer keyboard 210, which is disposed above the PCB 610. The elastomer keyboard 210 includes a group 710 of components that includes the elastomer keys 220 and the support pillar 250. The PCB 610 includes a group 720 of components that includes the keypad contacts 620. The circular button 140, the group 710, and the group 720 comprise a component that can be referred to as a 16-direction switch, or navigational or directional controller, without being limited to a specific number of keypads and directions.

When a 16-direction switch is installed on the device 110, it is anticipated that a user of the device 110 will apply pressure at a point on the perimeter of the circular button 140 and might move the pressure point in a smooth manner around the perimeter. This circular movement of the pressure point can cause a rocking action of an elastomer key's conducting material 420 across a keypad contact 620 that differs from the manner in which the conducting material 420 would contact a keypad contact 620 if direct downward pressure were applied.

For example, if a user pressed directly downward near the upper portion 142 of the circular button 140, the conducting material 420 on elastomer key 220*a* might contact the entire area of keypad contact 620*a*. If the user then began moving the pressure point toward elastomer key 220*b*, a portion of the conducting material 420 on elastomer key 220*b* might first contact the portion of keypad contact 620*b* that is closest to keypad contact 620*a*. As the pressure point continued to move, the entire area of the conducting material 420 on elastomer key 220*b* might contact the entire area of keypad contact 620*b*. If the pressure point continued to move toward elastomer key 220*c*, the conducting material 420 on elastomer key 220*b* might contact only the portion of keypad contact 620*b* that is closest to keypad contact 620*c*.

Figure 8:
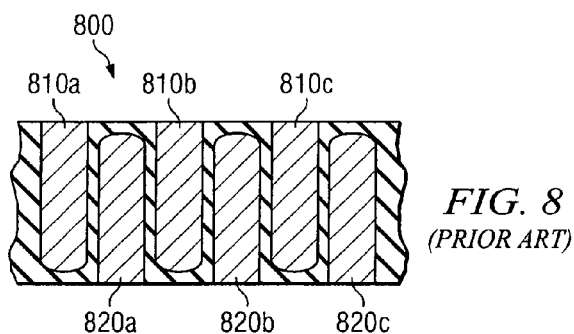
FIG. 8 is a diagram of a keypad contact according to the prior art.

Due to this rocking motion, the tactile feedback that a user receives from the 16-direction switch and the control that the user has over the movement of the cursor 130 can be enhanced by an appropriate configuration of the keypad contacts 620. FIG. 8 illustrates a keypad contact configuration 800 that is typically used in the prior art. A first plurality of finger-shaped electrical contacts 810 is maintained at a first electrical potential and a second plurality of finger-shaped electrical contacts 820 is maintained at a second electrical potential. The contacts 810 and the contacts 820 are interleaved with one another in the pattern illustrated so that a small gap is present between each pair of adjacent contacts 810 and 820. Since a plurality of small gaps are present over the entire area of the keypad contact 800, an electrical connection can be made between a contact 810 and a contact 820 when a conducting material touches almost any portion of the keypad contact 800.

Figure 9:
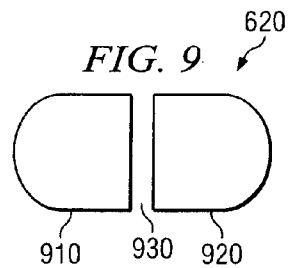
FIG. 9 is a diagram of a keypad contact according to an embodiment of the disclosure.

FIG. 9 illustrates one embodiment of a configuration for a keypad contact 620 that might be used in conjunction with a 16-direction switch. The keypad contact 620 includes a first portion 910 and a second portion 920 separated by a gap 930. Since only one gap 930 is present, electrical contact can be made between the first portion 910 and the second portion 920 only when a conducting material contacts both the first portion 910 and the second portion 920 across the gap 930. While the keypad contact 620 illustrated in FIG. 9 has a "double half moon" shape, one of skill in the art will recognize that other shapes could provide similar functionality.

Figure 10A:
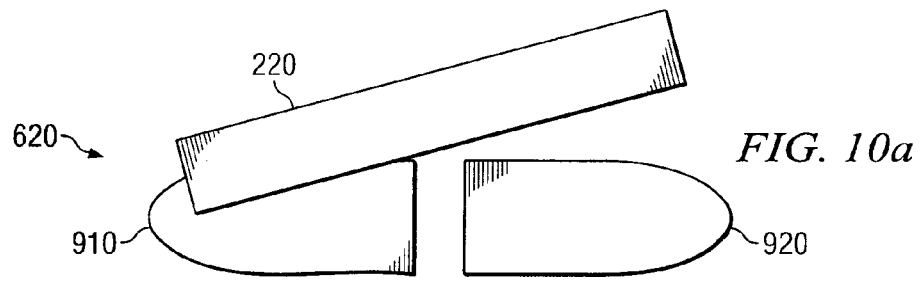
FIGS. 10a-10c are diagrams illustrating the movement of an elastomer key across a keypad contact according to an embodiment of the disclosure.

FIG. 10 illustrates the rocking motion that one of the elastomer keys 220 might make across one of the keypad contacts 620. In this example, it might be assumed that pressure is being applied to elastomer key 220*b* and that the pressure is moving in the direction from elastomer key 220*a* to elastomer key 220*c*. As pressure is first applied to elastomer key 220*b*, elastomer key 220*b* might be in the position shown in FIG. 10*a*, where elastomer key 220*b* is in contact with the first portion 910 of keypad contact 620*b* but not with the second portion 920 of keypad contact 620*b*. There is no electrical contact between the first portion 910 and the second portion 920 in this position.

Figure 10B:
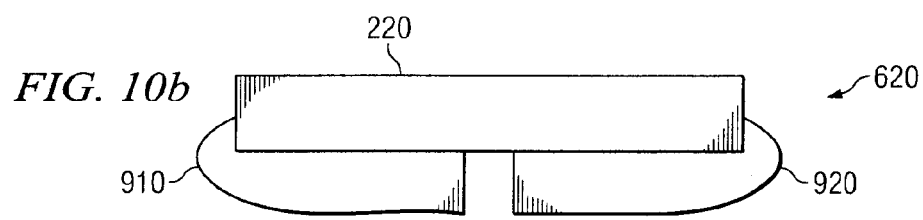

As the pressure point moves across elastomer key 220*b*, elastomer key 220*b* might reach the position shown in FIG. 10*b*, where elastomer key 220*b* is in contact with both the first portion 910 and the second portion 920 of keypad contact 620*b*. In this position, there is an electrical contact between the first portion 910 and the second portion 920 via the conducting material 420 on the lower surface of elastomer key 220*b*.

Figure 10C:
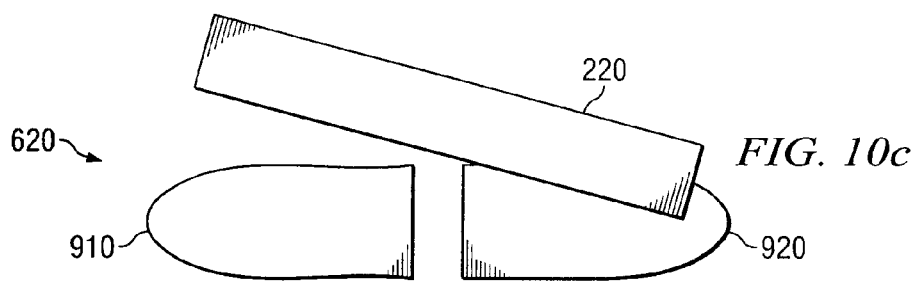

As the pressure point continues to move toward elastomer key 220*c*, elastomer key 220*b* might reach the position shown in FIG. 10*c*, where elastomer key 220*b* is in contact with the second portion 920 of keypad contact 620*b* but not with the first portion 910 of keypad contact 620*b*. In this position, there is again no electrical contact between the first portion 910 and the second portion 920.

The keypad contact configuration illustrated in FIG. 9 allows electrical contact to be made between the first portion 910 and the second portion 920 of the keypad contact 620 only when the elastomer key 220 is pressed in a substantially directly downward direction. This can provide a user of the device 110 with a discrete impression of moving the cursor 130 in a new direction as the pressure point on the circular button 140 is moved around the perimeter of the circular button 140. This, in turn, can give the user enhanced tactile feedback from the 16-position switch and a feeling of enhanced control over the cursor 130. In contrast, any engagement or contact of the elastomer key 220 to prior art keypad contact 800 (shown in FIG. 8) would generate an electrical connection. For example, the elastomer key 220 positions or attitudes illustrated in FIGS. 10*a* and 10*c* would both produce electrical contact if the prior art keypad contact 800 were used.

Figure 11:
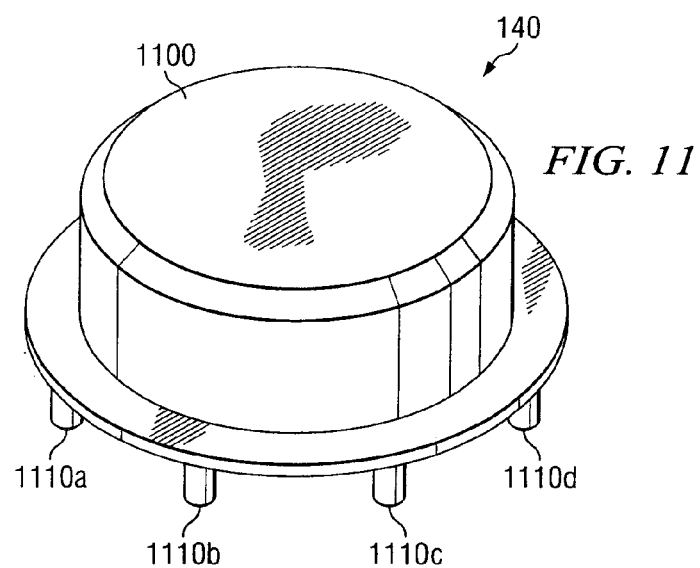
FIG. 11 is a diagram of the upper surface of a circular button according to an embodiment of the disclosure.
Figure 12:
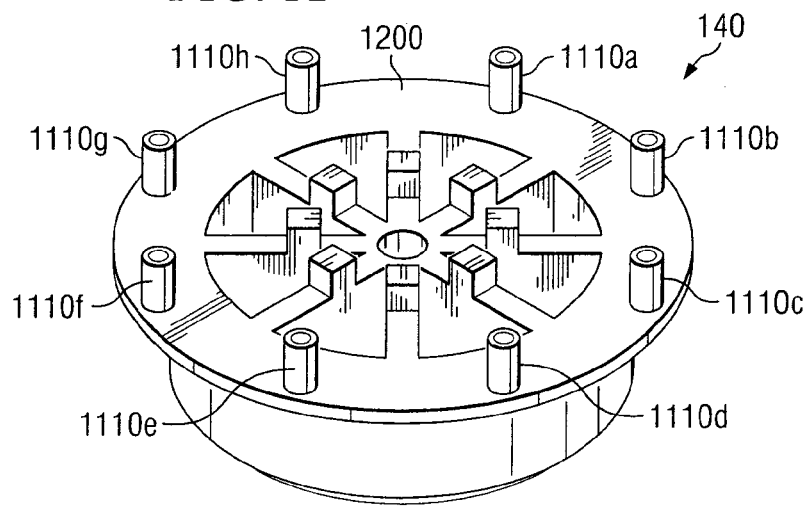
FIG. 12 is a diagram of the lower surface of a circular button according to an embodiment of the disclosure.

Tactile feedback and cursor control can also be enhanced by the configuration of the circular button 140. FIG. 11 illustrates the upper surface 1100 of an embodiment of the circular button 140. The circular button 140 is typically constructed from a rigid material such as plastic. A plurality of posts 1110 with an approximately cylindrical shape can be seen projecting from the circular button 140. FIG. 12 illustrates the lower surface 1200 of an embodiment of the circular button 140. In this view, it can be seen that eight posts 1110 are present on the lower surface 1200 of the circular button 140. The posts 1110 are approximately evenly spaced around the outer edge of the lower surface 1200 of the circular button 140.

Figure 13:
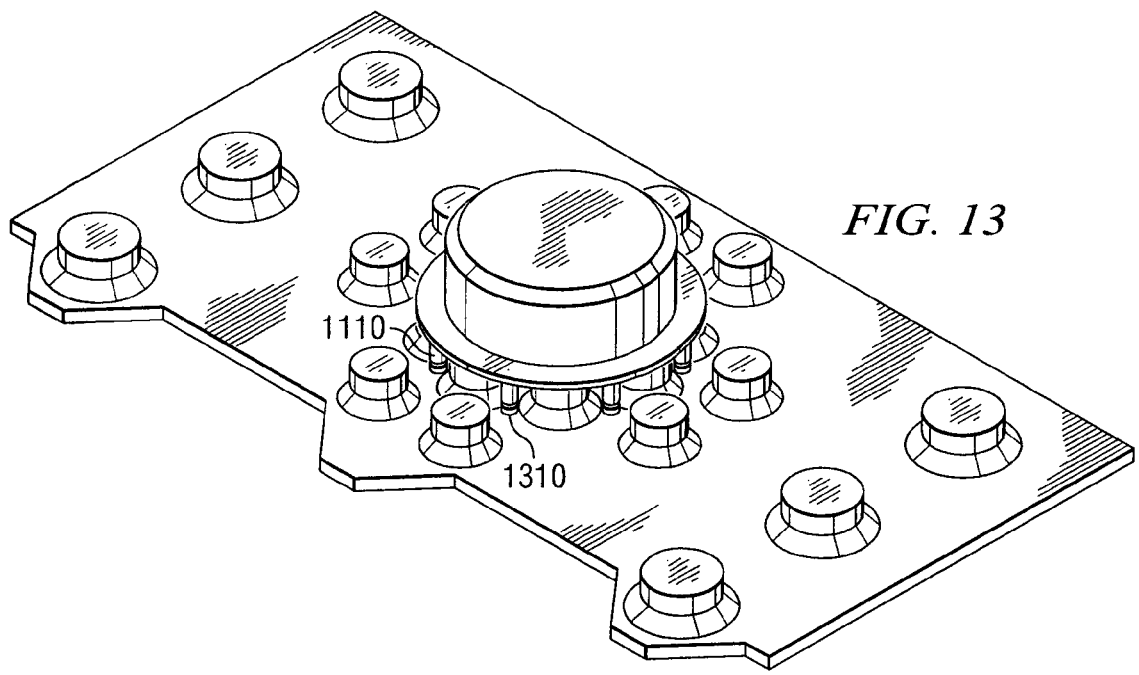
FIG. 13 is a diagram of a circular button and an elastomer keyboard according to an embodiment of the disclosure.

In an embodiment, holes with an approximately circular shape are present in the elastomer keyboard 210 near the central points between each pair of adjacent elastomer keys 220. The holes and the posts 1110 are arranged in approximately the same pattern and the holes have a diameter that is slightly larger than that of the posts 1110. When the circular button 140 is disposed above the elastomer keyboard 210, each post 1110 is disposed above a hole. This arrangement is depicted in FIG. 13, where one of the posts 1110 can be seen above a hole 1310.

When pressure is applied to the perimeter of the circular button 140, the circular button 140 pivots about the support pillar 250, causing a downward movement of one or more posts 1110 that lie beneath the point where the pressure was applied. If sufficient pressure is applied, one or more posts 1110 can pass through one or more underlying holes 1310 and make contact with the PCB 610. Contact of a post 1110 with the PCB 610 prevents further downward movement of the circular button 140, and consequently restricts the overall movement of the button 140, which limits the total number of elastomer keys 220 that are typically engaged.

In an embodiment, the posts 1110 are of such a length that a post 1110 engages the PCB 610 when the conducting material 420 on the lower surface of one or more elastomer keys 220 adjacent to that post 1110 contacts an underlying keypad contact 620. The rigidity of the posts 1110 provides tactile feedback to a user and prevents a "spongy" feeling as the pressure point is moved around the perimeter of the circular button 140. This tactile feedback can enhance the user's feeling of control over the movement of the cursor 130.

The posts 1110 and holes 1310 can also prevent twisting of the circular button 140. When a user is pressing downward on the circular button 140, a lateral pressure parallel to the upper surface of the circular button 140 might be inadvertently applied and might cause a rotation of the circular button 140. This could cause an unintended connection on a keypad contact 620 and thus cause an unintended movement of the cursor 130. When one or more posts 1110 are engaged in one or more holes 1310 or when the side of the post 1110 engages one of the elastomer keys 220, such rotation of the circular button 140 is prevented.

Figure 14:
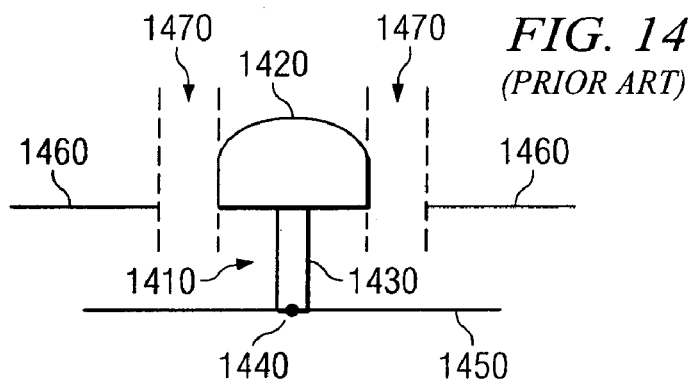
FIG. 14 is a diagram of a cursor control button according to the prior art.

The fact that, in an embodiment, the circular button 140 pivots about the support pillar 250 allows the gap between the circular button 140 and the upper surface of the exterior housing of the device 110 to be smaller than would be the case if the pivot point were lower. FIG. 14 illustrates a configuration that might have been used for a cursor control button, which will illustrate the advantages of the disclosed configuration. Such a button 1410 might consist of an upper portion 1420 and a lower shaft 1430 integrated into a single unit. The button 1410 might pivot about a point 1440 on a lower surface 1450 such as a PCB or an elastomer keyboard.

Since the pivot point 1440 is a relatively large distance from the perimeter of the upper portion 1420 of the button 1410, the button 1410 can travel a relatively large distance when pivoting before touching an edge 1460 of the exterior housing of the device in which the button 1410 is installed. This large potential travel distance requires that a relatively large gap 1470 be maintained between the upper portion 1420 of the button 1410 and the edges 1460 of the housing of the device. The large gap 1470 can cause an undesirable exposure of the interior of the device and switch to exterior elements.

Figure 15:
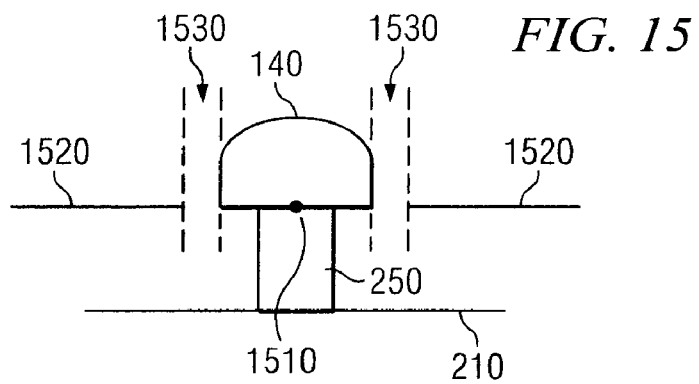
FIG. 15 is a diagram of a circular button and support pillar according to an embodiment of the disclosure.

FIG. 15 illustrates one embodiment of a configuration of the 16-direction switch. The circular button 140 pivots about the upper surface of the support pillar 250. This pivot point 1510 is located closer to the perimeter of the circular button 140 compared to the location of the pivot point 1440 in FIG. 14. This results in a relatively small travel distance, when the circular button 140 pivots, before the circular button 140 touches an edge 1520 of the exterior housing of the device 110. The small travel distance results in a small gap 1530 compared to the gap 1470 of FIG. 14 and reduces the exposure of the interior of the device 110.

Figure 16:
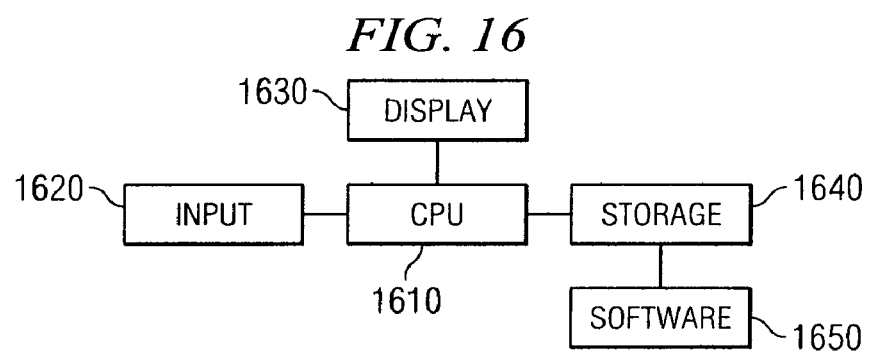
FIG. 16 is a block diagram of a portion of the components that might be present in a handheld electronic device according to an embodiment of the disclosure.

As mentioned previously, a software component within the device 110 is capable of receiving input signals generated by the movement of a 16-position switch and causing movement of the cursor 130 based on the input signals. FIG. 16 is a block diagram of the components, including the software component, that might be present within the device 110. A processor or CPU 1610 can receive input from an input component 1620. The input component 1620 might include the buttons 160, a 16-direction switch, and other means for data input. Information might be displayed on a display component 1630, which might include the display area 120.

Information can be stored in a storage component 1640, which might include operating instructions for the CPU 1610, applications that can execute on the CPU 1610, data that is processed by the CPU 1610, and other information. Among the applications that can be stored in the storage component 1640 is the software component 1650 that can receive input signals and control the cursor 130.

When the software component 1650 receives a single input signal, the software component 1650 can cause a cursor movement in a direction that corresponds to the location of the keypad contact 620 that generated the input signal. For example, when the keypad contact 620a in the 'north' position generates an input signal, the software component 1650 causes a cursor movement in the 'north' direction.

When the software component 1650 receives input signals from two adjacent keypad contacts 620 simultaneously, the software component 1650 can cause a cursor movement in a direction midway between the locations of the two keypad contacts 620. For example, when the keypad contact 620a in the 'north' position and the keypad contact 620b in the 'northeast' position generate input signals simultaneously, the software component 1650 causes a cursor movement in the 'north by northeast' direction.

When the software component 1650 receives input signals from three adjacent keypad contacts 620 simultaneously, the software component 1650 can cause a cursor movement in a direction corresponding to the location of the center keypad contact 620. For example, when the keypad contact 620a in the 'north' position, the keypad contact 620b in the 'northeast' position, and the keypad contact 620c in the 'east' position generate input signals simultaneously, the software component 1650 causes a cursor movement in the 'northeast' direction.

In an embodiment, the software component 1650 can operate in one of two different modes depending on the type of device in which the software component 1650 is present. In one of the modes, the software component 1650 is present in the device 110 that includes an 8-button, 16-direction switch as described above and the software component 1650 operates in the manner described above.

In the other mode, the software component 1650 is present in a device that has only four keypad contacts. In such a device, the keypad contacts are typically arranged in a 'north, south, east, west' pattern. If electrical contact is made on only one of the keypad contacts, a cursor moves in a direction corresponding to the location of that keypad contact. If electrical contact is made on two adjacent keypad contacts, the cursor moves in a direction corresponding to the midpoint of the two keypad contacts. The software component 1650 is capable of receiving input signals from the keypad contacts in such a device and causing the appropriate cursor movement. The software component 1650 is also capable of automatically determining whether the device in which it is present includes a 16-direction switch or a four-keypad cursor controller and automatically entering the appropriate mode depending on the type of device in which it is present.

In an embodiment, the software component 1650 is present in the device 110 that includes a 16-direction switch and, depending on the application that is executing on the device 110, is capable of communicating regarding cursor movement in sixteen different directions, only eight different directions, or only four different directions. For example, some applications, such as a graphics program, might need fine cursor control for which sixteen-direction cursor movement would be appropriate. Other applications, such as a spreadsheet program, might need a cursor to move only in the up, down, left, and right directions. Still other applications might need a cursor to move in eight directions. The software component 1650 can communicate with the application regarding the appropriate type of cursor movement or information needed by the application related to cursor movement. The software component 1650 can continue to cause a particular type of cursor movement or provide appropriate directional information as long as an application requires that type of cursor movement. When the focus of the device 110 changes to an application for which a different type of cursor movement is appropriate, the software component 1650 can automatically cause a different type of cursor movement to occur.

As an example, if a spreadsheet application is executing on the device 110 and a user of the spreadsheet presses the 'north' portion 142 of the circular button 140, the active cell in the spreadsheet might move upwards. If the user presses the 'northeast' portion of the circular button 140, the software component 1650 might ignore the input from the 'northeast' keypad contact 620 or might map the input from the 'northeast' keypad contact 620 to a different cursor movement direction. The software component 1650 can continue to treat the 16-direction switch as a 4-direction switch until an application for which a different type of cursor movement is appropriate becomes the focus of the device 110.

The software component 1650 might also be thought of as having the capability to return a keypad event or a mouse event depending on the application currently active on the device 110. That is, the application might inform the software component 1650 whether pressing the circular button 140 should cause an action equivalent to the action taken when a traditional mouse button is pressed or an action equivalent to the action taken when a traditional keypad button is pressed. The software component 1650 might then cause the appropriate type of event to be returned when the circular button 140 is pressed.

Figure 17:
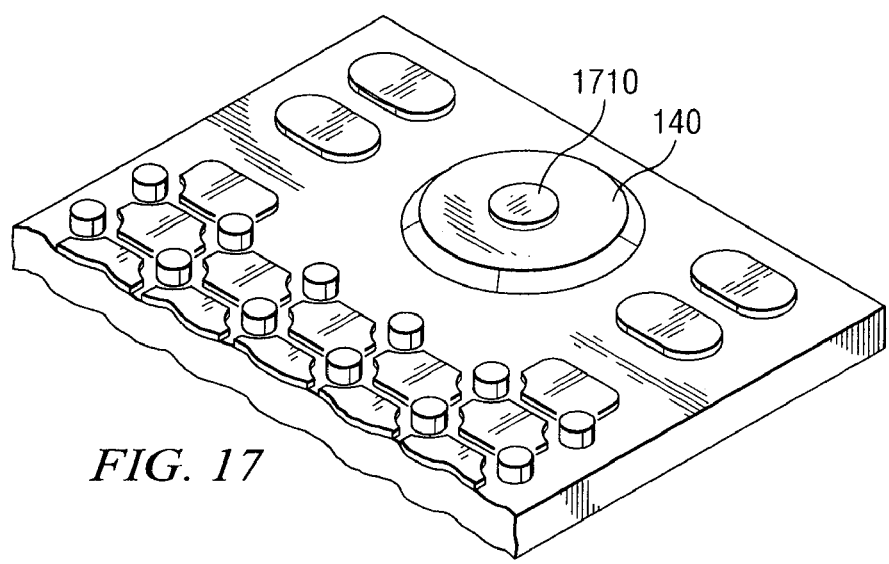
FIG. 17 is a diagram of a circular button with a center button according to an embodiment of the disclosure.
Figure 18:
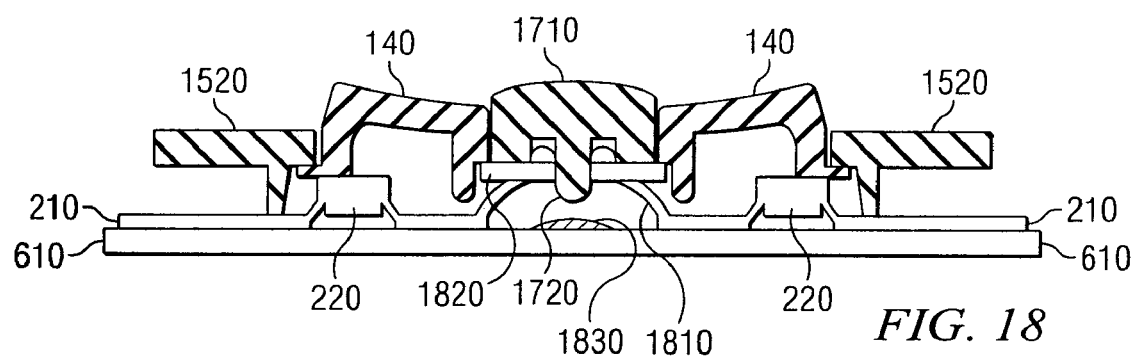
FIG. 18 is a cross section view of a circular button, center button, and elastomer keyboard according to an embodiment of the disclosure.

In various alternative embodiments, a button may be present within the circular button 140. This is illustrated in FIG. 17, where a round center button 1710 can be seen near the center of the circular button 140. When the center button 1710 is present, the support pillar 250 described above would typically not be present so that the center button 1710 may be pressed downward. FIG. 18 illustrates a cross-section view of an embodiment of a configuration for the circular button 140, the center button 1710, and the nearby components that might allow the circular button 140 to function without the support pillar 250.

In this embodiment, the elastomer keyboard 210 is disposed above the PCB 610 as described above. The center button 1710 rests upon a raised portion 1810 of the elastomer keyboard 210. The inner portion of the circular button 140 rests upon a lip 1820 protruding from the lower portion of the center button 1710. The outer portion of the circular button 140 rests upon the elastomer keys 220. Pressing the center button 1710 downward causes the raised portion 1810 of the elastomer keyboard 210 to collapse, allowing a contact point 1720 on the lower portion of the center button 1710 to touch a contact point 1830 on the PCB 610. Contact between these two points can initiate a function that is associated with the center button 1710.

The center button 1710 might perform various functions such as acting in a manner similar to the action of the 'Enter' button on a standard keyboard. Alternatively, the 'click' and 'grab' actions commonly available with a computer mouse might be combined into the single center button 1710. On a traditional mouse, pressing and then quickly releasing a button might be interpreted as a click and pressing and holding the button might be interpreted as a grab. Previously, on a device that has no mouse, the click and grab functions might be provided by two separate buttons. On a small device such as the device 110, it might be desirable to reduce the number of buttons 160 on the device 110.

In an embodiment, a timer can be used in conjunction with the center button 1710 to allow the center button 1710 to provide both the click and the grab actions. When the center button 1710 is pressed, the timer begins a count. If the center button 1710 is released before the count reaches a pre-defined level, the pressing of the center button 1710 is considered a click. If the count reaches the pre-defined level before the center button 1710 is released, the pressing of the center button 1710 is considered a grab.

Alternatively, the center button 1710 might not be present and the click and grab functions might be carried out by pressing a substantial portion of the entire circular button 140 downward. As mentioned previously, when the support pillar 250 is present, it is anticipated that pressing more than four elastomer keys 220 simultaneously would not be possible. When the support pillar 250 is not present, pressing more than four elastomer keys 220 simultaneously might be possible if a substantial portion of the entire circular button 140 is pressed. In an embodiment, pressing the circular button 140 in such a manner that more than four elastomer keys 220 are pressed simultaneously might cause the click and grab actions described above in the case of the center button 1710. That is, pressing and quickly releasing a substantial portion of the circular button 140 might cause a click and pressing and holding a substantial portion of the circular button 140 might cause a grab.

In other embodiments, the number of elastomer keys 220 that need to be pressed for these actions to occur might be four or less. It can be seen that when the circular button 140 can provide this function, it might not be desirable to have the center button 1710 present since it may be difficult for a user to press a substantial portion of the circular button 140 downward without simultaneously pressing the center button 1710.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A directional controller for a device, comprising:
   keypad contacts on a printed circuit board (PCB);
   a keyboard having more than four keys, each key disposed adjacent one of the keypad contacts;
   a button operable for pivoting engagement with the more than four keys to promote contact between the more than four keys and the adjacent one of the keypad contacts; and
   posts extending from an underside of the button and operable such that the posts obtain support from at least one of the keyboard and PCB when the button is pivoted to engage the more than four keys.

2. The directional controller of claim 1, comprising only eight keys substantially circularly disposed about a point on the PCB.

3. The directional controller of claim 2, wherein: the first key is provided generally north of a point on the PCB, the second key is provided generally northeast of the point on the PCB, the third key is provided generally east of the point on the PCB, the fourth key is provided generally southeast of the point on the PCB, the fifth key is provided generally south of the point on the PCB, the sixth key is provided generally southwest of the point on the PCB, the seventh key is provided generally west of the point on the PCB, and the eighth key is provided generally northwest of the point on the PCB.

4. The directional controller of claim 3, further comprising a software component operable when one of the keys is pressed and engages the adjacent keypad contact to promote movement of a cursor in one of eight directions on an application operating on the device, the one of eight directions associated with the position of the key relative to the point on the PCB.

5. The directional controller of claim 4, comprising the software component further operable when two directly adjacent keys are simultaneously pressed and engage the adjacent keypad contacts to promote movement of the cursor in one of eight mid-point directions on the application operating on the device, the mid-point direction substantially midway between a first direction associated with the position of one of the pressed keys relative to the point on the PCB and a second direction associated with the position of the other of the pressed keys relative to the point on the PCB, such that the software component is operable to promote movement of the cursor in one of sixteen possible directions.

6. The directional controller of claim 5, comprising the software component further operable when three directly adjacent keys are simultaneously pressed and engage the adjacent keypad contacts to promote movement of the cursor in the direction associated with the position of a middle key relative to the point on the PCB, the middle key being a key in a middle of the three directly adjacent keys.

7. The directional controller of claim 3, further comprising a software component operable when one of the keys is pressed and engages the adjacent keypad contact to logically resolve the pressed key to one of eight directions, the one of eight directions associated with the position of the key relative to the point on the PCB.

8. The directional controller of claim 2, wherein the button is provided on a base elevated above a surface of the keyboard to raise a pivot point of the button, the base provided substantially adjacent the point on the PCB.

9. The directional controller of claim 1, wherein the button is operable when pressed by a user for pivoting in a plurality of directions to engage the more than four keys.

10. The directional controller of claim 1, wherein each of the keypad contacts is provided within a separate area on the PCB, each of the keypad contacts having at least a first conductive portion provided in a first half of the separate area and further having at least a second conductive portion provided in a second half of the separate area.

11. The directional controller of claim 1, wherein the keyboard is an elastomer keyboard.

12. The directional controller of claim 1, wherein the device is selected from a group consisting of a handheld calculator, a handheld gaming device, a mobile communications device, and a personal digital assistant (PDA).

13. A method for user input, comprising:
selecting one or more of at least eight keys; and
determining, based on the selected keys, one of at least sixteen directions based on which of the one or more of the at least eight keys were selected, wherein posts extend from an underside of each key to obtain support from at least one of a keyboard and a PCB when more than four keys are engaged.

14. The method of claim 13, further comprising: an application requesting a response that includes only one of four directions; and providing the application with only one of a north, a south, an east, and a west direction indicated based on which of the one or more of the at least eight keys were selected.

15. The method of claim 13, further comprising: simultaneously selecting a first and a second key of the eight keys, and wherein the direction determined based on the selection of the first and second keys is a midpoint direction between a direction indicated by the first key and a direction indicated by the second key.

16. The method of claim 13, further comprising: simultaneously selecting a first key, a second key, and a third key of the eight keys, wherein the second key is between the first and third keys; and wherein the direction determined based on selection of the first, second and third keys is a direction indicated by the second key.

17. A machine readable medium containing software instructions to promote a user using keys on a device for navigation, comprising:
in response to keys being engaged on the device by the user, a software programmed, using a processor, to determine one of at least sixteen directions indicated based on which keys were engaged;
a first mode wherein the device includes four keys, the software programmed to determine one of eight directions indicated based on which of the four keys were engaged;
a second mode wherein the device includes eight keys, the software programmed to determine one of sixteen directions indicated based on which of the eight keys were engaged; and
posts extending from an underside of the button and operable such that the posts obtain support from at least one of the keyboard and PCB when the button is pivoted to engage the more than four keys.

18. The machine readable medium of claim 17, wherein when the device includes eight keys:
If the software receives a request from an application to provide only one of four directions (north, south, east, west) in response to navigational keys being engaged on the device by the user, the software operable to determine one of four directions indicated based on which of the eight keys were engaged;
if the software receives a request from an application to provide only one of eight directions (north, northeast, northwest, south, southeast, southwest, east, west) in response to navigational keys being engaged on the device by the user, the software operable to determine one of eight directions indicated based on which of the eight keys were engaged; and
if the software receives a request from an application to provide one of sixteen directions (north, northeast, northwest, south, southeast, southwest, east, west, and eight midpoints therebetween) in response to navigational keys being engaged on the device by the user, the software operable to determine one of sixteen directions indicated based on which of the eight keys were engaged.

* * * * *